(12) United States Patent
Lacroix

(10) Patent No.: US 8,872,834 B2
(45) Date of Patent: Oct. 28, 2014

(54) ELECTRONIC PAYMENT TERMINAL WITH AN IMPROVED DISPLAY

(75) Inventor: Pierre Lacroix, Saint Peray (FR)

(73) Assignee: Compagnie Industrielle et Financiere d'Ingenierie "Ingenico", Neuilly sur Seine (FR)

( * ) Notice: Subject to any disclaimer, the term of this patent is extended or adjusted under 35 U.S.C. 154(b) by 395 days.

(21) Appl. No.: 13/122,053

(22) PCT Filed: Oct. 1, 2009

(86) PCT No.: PCT/FR2009/051869
§ 371 (c)(1),
(2), (4) Date: May 24, 2011

(87) PCT Pub. No.: WO2010/037978
PCT Pub. Date: Apr. 8, 2010

(65) Prior Publication Data
US 2011/0216080 A1 Sep. 8, 2011

(30) Foreign Application Priority Data
Oct. 1, 2008 (FR) ...................................... 08 56634

(51) Int. Cl.
*G06F 13/14* (2006.01)
*G07F 19/00* (2006.01)
*G06F 3/147* (2006.01)

(52) U.S. Cl.
CPC .......... *G06F 3/147* (2013.01); *G09G 2370/045* (2013.01); *G09G 2360/02* (2013.01); *G07F 19/206* (2013.01); *G07F 19/20* (2013.01)
USPC ....................................................... 345/520

(58) Field of Classification Search
None
See application file for complete search history.

(56) References Cited

U.S. PATENT DOCUMENTS

| 6,425,822 | B1 * | 7/2002 | Hayashida et al. ............... 463/7 |
| 8,146,801 | B1 * | 4/2012 | Crews et al. .................. 235/379 |
| 2002/0196963 | A1 * | 12/2002 | Bardwell ....................... 382/124 |
| 2006/0168416 | A1 * | 7/2006 | Kessels et al. ................ 711/167 |
| 2009/0109334 | A1 * | 4/2009 | Murakami ..................... 348/500 |

FOREIGN PATENT DOCUMENTS

| EP | 1672461 A | 6/2006 |
| WO | 95/19595 A | 7/1995 |

OTHER PUBLICATIONS

"Written Opinion of the International Searching Authority" issued in PCT/FR2009/051869 issued on May 25, 2011.
Search Report issued in PCT/FR2009/051869 on Apr. 19, 2010.

\* cited by examiner

*Primary Examiner* — Kimbinh T Nguyen
*Assistant Examiner* — Raffi Isanians
(74) *Attorney, Agent, or Firm* — Vedder Price PC

(57) ABSTRACT

An electronic payment terminal is disclosed including a display screen including first and second terminals for receiving display data, a first processor connected to the first terminal and adapted for supplying display data to the first terminal at a first rate, and a second processor connected to the second terminal and adapted for supplying display data to the second terminal at a second rate lower than the first rate and adapted for supplying to the display screen a signal for the selection of the display data received at one of the first and second terminals. The second processor is further connected to the first processor and is adapted to send to the first processor a signal for authorizing or forbidding the transmission of display data to the display screen.

7 Claims, 1 Drawing Sheet

ELECTRONIC PAYMENT TERMINAL WITH AN IMPROVED DISPLAY

FIELD OF THE INVENTION

The present invention relates to electronic payment units, and in particular electronic payment units provided with a display screen.

DISCUSSION OF THE RELATED ART

An electronic payment unit generally comprises a housing containing a printed circuit to which are connected various components, including a keyboard, a chip card reader, a magnetic card reader, a display screen, a liquid crystal display or LCD, etc.

A processor, attached to the printed circuit, enables to perform an electronic payment operation. It especially controls the data exchange with the chip of a chip card introduced into the card reader, the data display on the display screen, etc. Due to the security constraints imposed by banks for electronic payment operations, the processor generally implements ciphering algorithms in the data exchange with the chip card. Such a processor is generally called a security processor or cryptoprocessor.

Due to its operation, the security processor is not capable of transmitting data at a high rate to the display. Thereby, the images displayed on the display screen of an electronic payment unit are generally limited to prompts for example corresponding to sequences of alphanumeric characters. As an example, during a payment operation, the security processor may send an order to display the amount of the financial transaction, then to display a prompt such as "input code" or "code?". The user then inputs a confidential code via the electronic payment unit keyboard, the confidential code being stored in a memory of the security processor. Most of the time, the display screen of the electronic payment unit remains unused or is only used to display a fixed image.

The design of the security processor is a complex operation given the multiple security constraints imposed for the electronic payment operations that the security processor must perform. It can thus, in practice, uneasily be envisaged to modify the security processor to have it transmits data to the display at a higher rate.

SUMMARY

The present invention aims at obtaining an electronic payment unit enabling to display images at a high rate on a display while remaining compatible with the security constraints specific to the field of electronic payment operations.

According to another object, the display of the electronic payment unit may be a conventional display.

To achieve all or part of these objects, as well as others, an embodiment of the present invention provides an electronic payment unit comprising a display comprising first and second terminals for receiving display data; a first processor connected to the first terminal and capable of providing display data to the first terminal at a first rate; and a second processor connected to the second terminal and capable of providing display data to the second terminal at a second rate lower than the first rate and capable of providing the display with a signal of selection of the display data received on one of the first or second terminals. The second processor is further connected to the first processor and is capable of providing the first processor with a signal for allowing or forbidding the transmission of display data to the display.

According to an embodiment of the present invention, the display comprises a third terminal and the second processor is connected to the third terminal and is capable of providing the selection signal to the third terminal.

According to an embodiment of the present invention, the display is a liquid crystal display.

According to an embodiment of the present invention, the first processor is connected to the first terminal by a parallel link.

According to an embodiment of the present invention, the second processor is connected to the second terminal by a serial link.

According to an embodiment of the present invention, the second processor is connected to a chip card and/or magnetic card reader.

According to an embodiment of the present invention, the second processor is connected to a device for detecting an unauthorized access to the unit.

An embodiment of the present invention also provides a method for displaying display data on a display of an electronic payment unit, said display comprising first and second terminals for receiving display data, the payment unit further comprising a first processor connected to the first terminal and capable of providing display data to the first terminal at a first rate and a second processor connected to the second terminal and capable of providing display data to the second terminal at a second rate lower than the first rate. The method comprises having the second processor provide the display with a signal for selecting display data received on one of the first or second terminals and providing the first processor with a signal for allowing or forbidding the transmission of display data to the display.

According to an embodiment of the present invention, when the second processor provides the display with a signal for selecting the display data received on the first terminal, the second processor transmits a signal to the first processor allowing it to provide display data to the display. When the second processor transmits to the display a signal for selecting the display data received on the second terminal, the second processor provides the first processor with a signal notifying it not to transmit display data to the display.

According to an embodiment of the present invention, the display comprises a control unit and a display panel, the control unit being capable of displaying on the display panel images obtained based on the display data. Before the second processor provides the display with the signal for selecting the display data received on the first terminal, the second processor provides configuration data to the display. The control unit is capable of displaying images obtained from the display data received on the first terminal on a portion only of the display panel which depends on the configuration data.

BRIEF DESCRIPTION OF THE DRAWINGS

The foregoing objects, features, and advantages of the present invention will be discussed in detail in the following non-limiting description of specific embodiments in connection with the accompanying drawings, among which.

DETAILED DESCRIPTION

Figure 1:
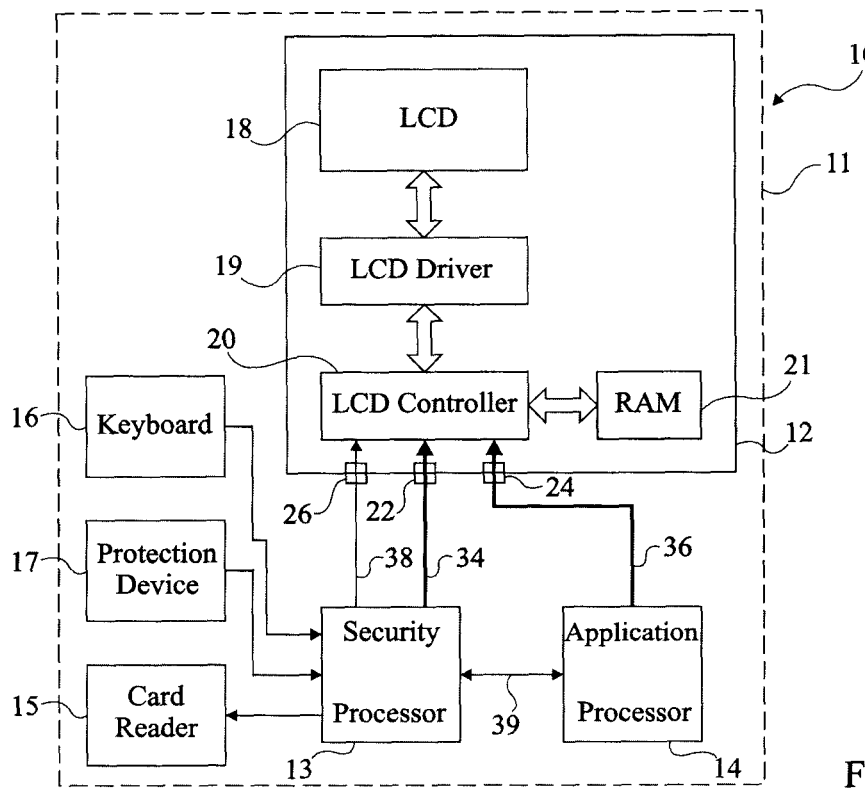
FIG. 1 shows, in the form of a block diagram, certain components of an electronic payment unit according to an embodiment of the present invention.

For clarity, the same elements have been designated with the same reference numerals in the different drawings. In the following description, data transmitted to a display and which enable to display one or several images are called display data. Data transmitted to a display and which enable to define the operating parameters of the display for the subsequent display of images (number of colors, portion of the display used to display the images, etc.) are called configuration data.

An embodiment of the present invention is based on the fact that most displays currently available for sale comprise several access terminals enabling to receive data (display and configuration data), generally at different rates. Conventionally, only one of the access terminals is used in practice, according to the features of the processor connected to the display. In an electronic payment unit, only the access terminal enabling to receive data at low rate is used and connected to the security processor. An embodiment of the present invention provides using, in addition to the security processor, another processor which does not perform operations submitted to the security constraints specific to electronic payment operations and which is capable of providing display data to a display over a high-rate link to enable to display high-rate images on the display. To remain compatible with the security constraints specific to electronic payment operations, only the security processor can determine the display data to be taken into account by the display at a given time.

FIG. 1 shows in the form of a block diagram an electronic payment unit 10 according to an embodiment of the present invention. Only those elements which are useful to the understanding of the present invention will be described. The elements taking part in the usual operation of the electronic payment unit without being directly involved in the context of the present invention will not be described.

Electronic payment unit 10 comprises a housing 11 containing the following elements:
- a display 12;
- a first processor 13, called security processor, and a second processor 14 (application processor), separate from first processor 13;
- a chip card and/or magnetic card reader 15;
- a keyboard 16; and
- at least one protection device 17 capable of detecting whether an unauthorized access to housing 11 has occurred.

These different elements may be connected to a printed circuit, not shown, contained in housing 11 and which ensures the electric connections between these elements. Housing 11 comprises openings, not shown, enabling a user to see the images displayed on screen 12, to manipulate keyboard 16, and to introduce a card into reader 15.

Display 12 for example corresponds to an LCD such as the LCD sold by Wintek under reference DF3224XM-6FLW. As an example, display 12 comprises a display panel 18 (LCD). This panel is, for example, formed of pixels that may be selected via display electrodes. Display 12 comprises a display unit 19 (LCD driver) which controls the electrodes of display panel 18. Display 12 further comprises a control unit 20 (LCD controller) capable of exchanging data with display unit 19 and with a volatile memory 21 (RAM). Display 12 comprises two access terminals 22, 24 for the reception of data, especially display data. As an example, access terminal 24 is capable of receiving high-rate data and access terminal 22 is capable of receive low-rate data. Screen 12 further comprises a selection terminal 26 capable of receiving a selection signal. According to the selection signal received on terminal 26, control unit 20 uses the display data received on access terminal 22 or on access terminal 24. The received display data may be stored in memory 21. Control unit 20 is further capable of converting the display data stored in memory 21 and/or directly received on access terminal 22 or at access terminal 24 into signals adapted to display unit 19.

Conventionally, security processor 13 is capable of controlling the operation of payment unit 10 when a payment operation is performed. An example of operation of a security processor or cryptoprocessor is described in French patent application 07/55148 filed by Sagem Monetel. Security processor 13 is connected to display 12, to keyboard 16, to reader 15, and to protection device 17. In particular, security processor 13 enables to exchange data in encrypted form with a bank card placed in reader 15 and enables to securely store confidential data. Protection device 17 for example corresponds to dummy keys and/or to a flexible printed circuit comprising mesh tracks as described in French patent applications 06/50617 and 06/54845 filed by Sagem Monetel. Protection device 17 transmits to security processor 13 an alert signal upon detection of an unauthorized access to unit 10. Security processor 30 can then control the stopping of unit 10 and the deleting of any confidential data stored in the memory. Security processor 13 is capable of providing display and configuration data to display 12 via a low-rate link 34, for example, a serial link, connected to access terminal 22. Processor 14 is capable of providing display data to display 12 via a high-rate link 36, for example, a link of parallel or RGB type, connected to access terminal 24. Processor 14 is not capable of providing configuration data to display 12.

Security processor 13 is capable of providing a selection signal to display 12 via a dedicated link 38 connected to selection terminal 26. Security processor 13 is connected to processor 14 by a data exchange link 39.

Link 34 allows a low-rate data transfer between security processor 13 and control unit 20, for example, on the order of 10 Mbits/s. This mainly only enables to display fixed images on panel 18, for example, prompts corresponding to sequences of alphanumeric characters. Link 36 enables to transfer data between processor 14 and control unit 20 at a high rate, for example, on the order of 100 Mbits/s. This enables to display videos on display panel 18. This for example applies to commercial or advertising videos.

Figure 2:
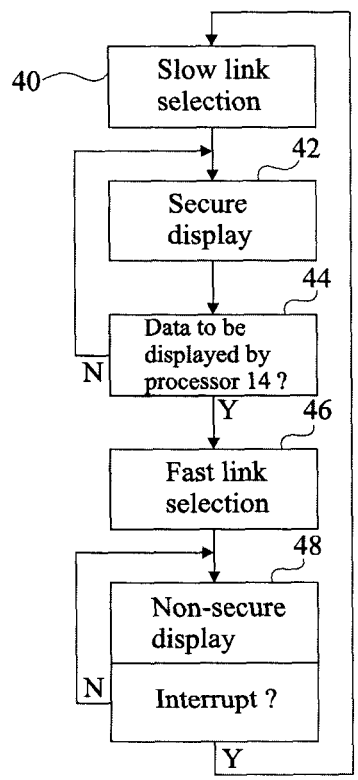
FIG. 2 illustrates steps of a method for using, according to an embodiment of the present invention, the electronic payment unit of FIG. 1.

FIG. 2 shows an operating mode of unit 10 of FIG. 1 according to an embodiment of the present invention. The method starts at step 40 at which security processor 13 transmits a selection signal to control unit 20 via link 38 through which it controls unit 20 so that it only takes into account the data (display data and/or configuration data) received on access terminal 22. Thereby, control unit 20 does not take into account the display data which would be received on access terminal 24. The method carries on at step 42.

At step 42, if messages are to be displayed on display 12 by security processor 13, security processor 13 transmits display data to control unit 20 via link 34. These data, that may be stored in memory 21, are converted into signals adapted to display unit 20 which accordingly controls display panel 18. Since security processor 13 is designed to respect the different security constraints specific to electronic payment operations, the display data provided to display 12 are data which comply with such security rules. When the step at which data are displayed by security processor 13 is over and security processor 13 has no new data to display, the method carries on at step 44.

At step 44, security processor 13 determines whether it has received a display request transmitted by processor 14 over link 39. If not, the method carries on at step 42 at which security processor 13 can again transmit data to display 12. If, at step 44, security processor 13 receives a display request transmitted by processor 14, the method carries on at step 46.

At step 46, security processor 13 transmits a selection signal to control unit 20 via link 38 through which it controls unit 20 so that said unit only takes into account the data received on access terminal 24. Thereby, control unit 20 does not take into account the display data which would be received on access terminal 22. Further, security processor 13 transmits a signal to processor 14 over link 39 to allow it to provide display data to control unit 20. The method carries on at step 48.

At step 48, processor 14 provides control unit 20 with display data over link 36. Display data, that may be stored in memory 21, are converted by control unit 20 to provide signals adapted to display unit 19 which controls the display of these data on display panel 18.

At step 48, as long as security processor 13 does not need to display data, processor 14 can keep on transmitting display data to display 12. As soon as security processor 13 needs to transmit data (display or configuration data) to display 12, it transmits a message to processor 14 over link 39, notifying it to interrupt the transmission of display data to display 12. Processor 14 then stops transmitting display data over link 36. The method then carries on at step 40 at which security processor 13, as described previously, transmits a selection signal to control unit 20 over link 38 through which it control unit 20 so that it only takes into account the data received on access terminal 22.

According to another embodiment, at step 48, display panel 18 is not entirely assigned to processor 14, a portion of display panel 18 remaining permanently assigned to security processor 13. In this case, at step 46, before security processor 13 transmits to control unit 20 a selection signal with which it controls unit 20 so that said unit only takes into account the display data received on access terminal 24, processor 13 transmits to control unit 20, via terminal 22, configuration data which define the portion of display panel 18 in which the display data provided by processor 14 will be displayed at step 48. Processor 13 may further transmit display data to control unit 20 to display, in the portion of display panel 18 which is not assigned to processor 14, a message indicating that the data which will be displayed on the rest of panel 18 at step 48 will not be displayed in the context of a secure payment operation. This message then remains displayed on display 12 all along step 48 during which microprocessor 14 transmits to control unit 20, through terminal 24, display data which result in the displaying of images in the portion of panel 18 assigned to processor 14.

The present embodiment of the present invention enables to take advantage of all the display possibilities offered by display 12. Indeed, security processor 13 being dedicated to electronic payment operations, it only allows to display prompts on display 18. Since the design of processor 14 is not submitted to the security constraints specific to electronic payment operations, it may control in a simple way the displaying of images or videos by taking advantage of the possibilities offered by display 12. The present embodiment of the present invention thus enables to optimize the use of display 12 while decreasing as much as possible the modifications to be brought to security processor 13. Further, the present embodiment enables to optimize the use of display 12 of electronic payment unit 10 since, when display 12 is not used by security processor 13, it may be used for other purposes by processor 14. Moreover, since the selection of data to be displayed is performed exclusively by security processor 13, via the selection signal transmitted to control unit 20, the security of the operation of the electronic payment unit is not altered.

Specific embodiments of the present invention have been described. Various alterations and modifications will occur to those skilled in the art. In particular, display 12 may have a structure different from that described previously.

The invention claimed is:

1. An electronic payment unit comprising:
   a display having first and second terminals for receiving display data;
   a first processor connected to the first terminal by a parallel link and adapted to provide display data to the first terminal at a first rate; and
   a second processor connected to the second terminal by a serial link and adapted to provide display data to the second terminal at a second rate lower than the first rate and adapted to provide the display with a signal of selection of the display data received on one of the first or second terminals, the second processor being further connected to the first processor and being adapted to provide the first processor with a signal for allowing or forbidding the transmission of display data to the display,
   wherein the second processor is adapted to transmit a signal to the first processor allowing the first processor to provide display data to the display when the second processor provides the display with a signal instructing the display to display the display data received on the first terminal, and wherein the second processor provides the first processor with a signal notifying the first processor not to transmit display data to the display when the second processor transmits to the display a signal instructing the display to display the display data received on the second terminal.

2. The unit of claim 1, wherein the display comprises a third terminal and wherein the second processor is connected to the third terminal and is adapted to provide the selection signal to the third terminal.

3. The unit of claim 1, wherein the display is a liquid crystal display.

4. The unit of claim 1, wherein the second processor is connected to a chip card and/or magnetic card reader.

5. The unit of claim 1, wherein the second processor is connected to a device for detecting an unauthorized access to the unit.

6. A method for displaying display data on a display of an electronic payment unit, said display comprising first and second terminals for receiving display data, the payment unit further comprising a first processor connected to the first terminal by a parallel link and adapted to provide display data to the first terminal at a first rate and a second processor connected to the second terminal by a serial link and adapted to provide display data to the second terminal at a second rate lower than the first rate, the method comprising having the second processor provide the display with a signal for selecting display data received on one of the first or second terminals and providing the first processor with a signal for allowing or forbidding the transmission of display data to the display,
   wherein when the second processor provides the display with a signal instructing the display to display the display data received on the first terminal, the second processor transmits a signal to the first processor allowing the first processor to provide display data to the display and wherein, when the second processor transmits to the display a signal instructing the display to display the display data received on the second terminal, the second processor provides the first processor with a signal notifying the first processor not to transmit display data to the display.

7. The method of claim 6, wherein the display comprises a control unit and a display panel, the control unit adapted to display on the display panel images obtained based on the display data and wherein, before the second processor provide the display with the signal for selecting the display data received on the first terminal, the second processor provides configuration data to the display, the control unit adapted to display images obtained based on the display data received on the first terminal on a portion only of the display panel which depends on the configuration data.

* * * * *